United States Patent [19]
Aardema et al.

[11] Patent Number: 5,906,351
[45] Date of Patent: May 25, 1999

[54] INTEGRATED ELECTROHYDRAULIC ACTUATOR

[75] Inventors: James A. Aardema, Plainfield; Edward W. Mate, Manhattan; Srikrishnan T. Tolappa, Aurora; Thomas J. Hajek, Jr., Lockport, all of Ill.

[73] Assignee: Caterpillar Inc., Peoria, Ill.

[21] Appl. No.: 08/994,242

[22] Filed: Dec. 19, 1997

[51] Int. Cl.$^6$ .......................... F15B 13/043; F15B 13/044
[52] U.S. Cl. ................... 251/30.01; 137/625.64; 137/625.65
[58] Field of Search .......... 137/625.64, 625.65; 251/30.01

[56] References Cited

U.S. PATENT DOCUMENTS

| | | | |
|---|---|---|---|
| 4,310,143 | 1/1982 | Determan | 137/625.65 X |
| 5,350,152 | 9/1994 | Hutchison et al. | 251/30.05 |
| 5,632,306 | 5/1997 | Taka | 137/625.64 |

*Primary Examiner*—Gerald A. Michalsky
*Attorney, Agent, or Firm*—John W. Grant; J. W. Burrows

[57] ABSTRACT

A low cost, electromagnetic efficient integrated electrohydraulic actuator includes a sleeve disposed within a housing and an annular electric coil formed as an integral part of the sleeve so that the coil is deeply integrated in the housing. An armature slidably disposed within an axial bore of the sleeve has the fluid metering functions integrally formed thereon so that the armature functions as a valve spool for controlling communication between an inlet port and an outlet port and between the outlet port and a tank port. The armature is thus the only movable part of the actuator.

15 Claims, 3 Drawing Sheets

INTEGRATED ELECTROHYDRAULIC ACTUATOR

TECHNICAL FIELD

This invention relates generally to electrohydraulic actuators and more specifically to low cost electrohydraulic actuators having a coil deeply integrated within the housing and only one moving part.

BACKGROUND ART

Electrohydraulic proportional actuators are commonly used to generate pilot pressure for actuating pilot actuated hydraulic control valves, clutches, brakes and the like. The generated pilot pressure normally acts against the fluid metering element of the proportional actuator so that the pilot pressure is proportional to the current used to energized the coil of the actuator. The perceived belief that proportional actuators should be a screw-in cartridge style and have a dry removable coil for serviceability increases the cost of the actuators. For example, screw-in cartridge style actuators require housing threads, hydraulic adapter threads and coil retention threads. Threads in general are costly to manufacture and generate a potential source of contamination to the hydraulic system. Also, such actuators typically have three movable parts, i.e. an armature, a pin and a ball or spool, and several parts that are brazed or welded together. Moreover providing a dry removable coil lowers the electromagnetic efficiency and increases the overall size of the actuator due to the existence of an air gap between the coil and the armature. The air gap results from the necessity of providing clearance to put the coil over the solenoid tube housing the armature and the pin. Finally, some proportional actuators have fixed small diameter orifices to minimize flow loses. However those small orifices causes contamination sensitivity and reduces response time.

Thus it is believed that the overall cost of electrohydraulic proportional actuators can be reduced by having no serviceable or replaceable coils, no threads, no welded parts, no small fixed orifices and only one moving part. It is also believed that the electromagnetic efficiency can be increased by deeply integrating the coil into the housing.

DISCLOSURE OF THE INVENTION

In one aspect of the present invention, an integrated electrohydraulic actuator includes a housing having a bore and an end wall at one end of the bore and a sleeve having an axial bore and seated in the bore of the housing. The sleeve co-operates with the housing to define an inlet port, an outlet port and a tank port opening into the axial bore. An annular coil is disposed in the bore of the housing at one end of the sleeve and has a pole piece fixedly secured within the annular coil. A cylindrical armature slidably disposed in sealing contact with the axial bore has a fluid metering function integrated therein for controllably metering fluid flow between the inlet and outlet ports and between the outlet and tank ports so that the armature functions as a valve spool when the coil is energized A retaining device retains the sleeve and the coil in the housing so that the armature is the only movable component.

BEST MODE FOR CARRYING OUT THE INVENTION

Figure 1:
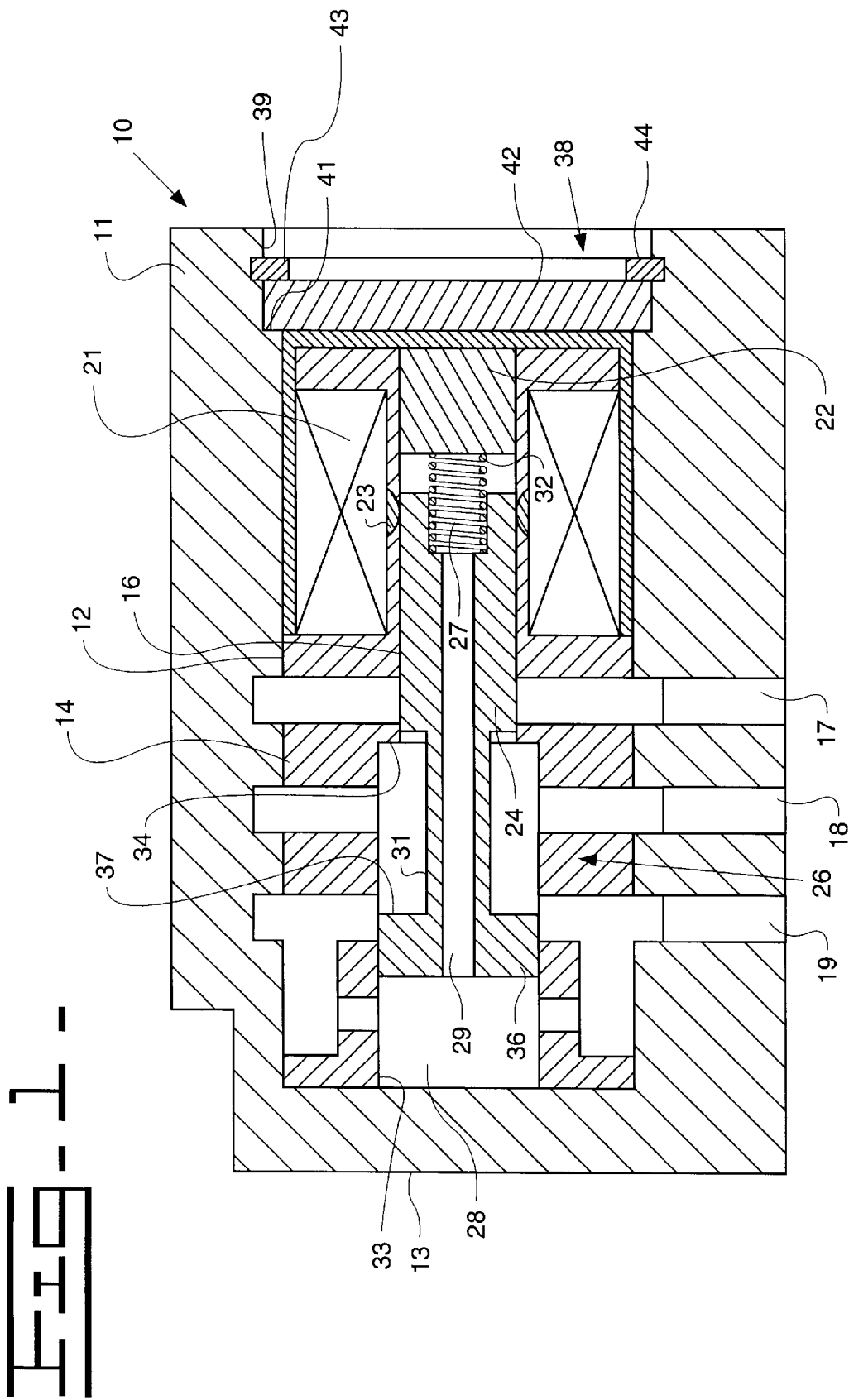
FIG. 1 is a diagrammatic sectional view of an embodiment of the present invention.

Referring to FIG. 1, an integrated electrohydraulic actuator 10 includes a housing 11 having a blind bore 12 closed at one end by an end wall 13. A sleeve 14 has an axial bore 16 and is seated in the blind bore 12. The sleeve co-operates with the housing 11 to define an inlet port 17, an outlet port 18 and a tank port 19 all of which open into the axial bore at axially spaced locations. An annular electrical coil 21 is disposed in the blind bore 12 of the housing at one end of the sleeve 14 and has a cylindrical pole piece 22 fixedly secured within the electrical coil 21. The electrical coil in this embodiment is a wet coil fully integrated within the sleeve 14 and thus is deeply integrated within the housing 11. The sleeve has an annular bead 23 of brazing material filling a pole gap. Alternatively, the coil 21 may be separate from the sleeve and positioned in the bore 12 in end-to-end relationship with the sleeve.

A cylindrical armature 24 is slidably disposed in sealing contact with the blind bore 12 and has a fluid metering means 26 integrated therein for controllably metering fluid flow between the inlet and outlet ports 17 and 18 and between the outlet and tank ports 18 and 19. The armature 24 thus functions as a movable valve spool when the coil 21 is energized by imputing an electric current thereto. A pair of fluid chambers 27,28 are defined between the armature and the pole piece and the end wall 13 and are interconnected through an axial passage 29. The metering means 26 includes an annular groove 31 in the armature continuously communicating with the outlet port 18. A compression spring 32 disposed within the fluid chamber 27 biases the armature away from the pole piece 22 to a position communicating the annular groove 31 with the tank port 19. The chamber 28 continuously communicates with the tank port 19.

The axial bore 16 of the sleeve 14 has an enlarged bore portion 33 defining an annular surface 34. The armature 24 has an enlarged fluid metering land 36 slidably disposed in the enlarged bore portion 33. The land 36 and the annular surface 34 in combination define a differential area 37 on the armature 24 with the differential area being continuously subjected to fluid in the outlet port 18 so that the fluid pressure in the outlet port is proportional to the current input to the coil 21.

A means 38 retains the sleeve 14 and the coil 21 in the housing 11 so that the armature 24 is the only movable component. The housing 11 has a counterbore 39 therein defining an annular shoulder 41 adjacent the blind bore 12. The retaining means 38 includes a disk 42 positioned in the counterbore, an annular groove 43 in the counterbore and an annular retainer 44 seated in the annular groove 43 to hold the disk against the annular shoulder 41.

Figure 2:
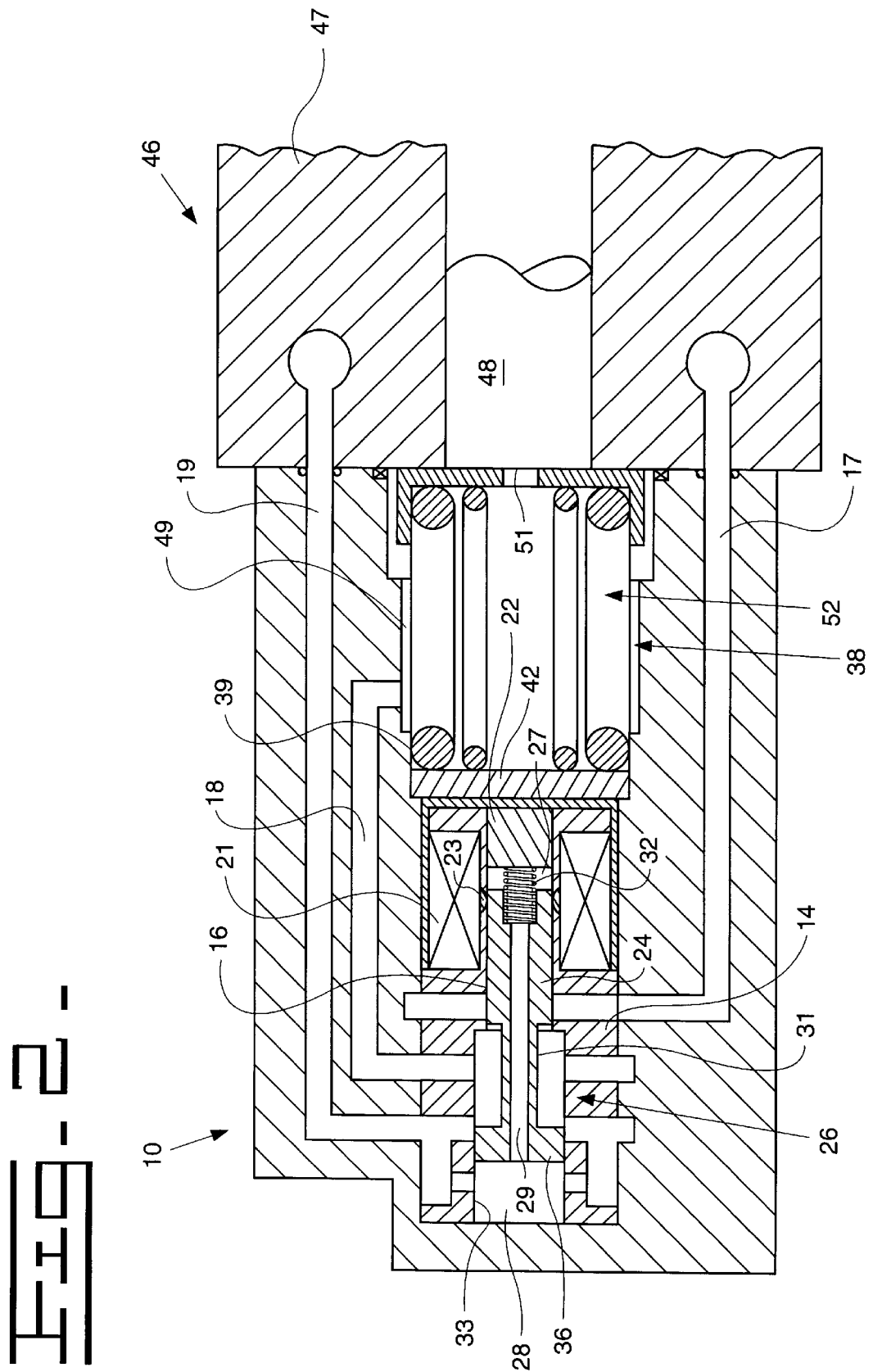
FIG. 2 is a diagrammatic sectional view of another embodiment of the present invention.

FIG. 2 discloses another embodiment of the integrated electrohydraulic actuator 10 and utilizes the same reference numerals to designate similarly constructed counterpart elements as identified in the embodiment of FIG. 1. In this embodiment, the integrated electrohydraulic actuator 10 is shown in combination with a pilot operated hydraulic valve 46 having a valve body 47 and a fluid control valve spool 48 slidably disposed in the valve body in the usual manner. The housing 11 of the electrohydraulic actuator 10 is suitably removably secured to the valve body 47 so that the counterbore 39 forms a pilot chamber 49 in communication with an end 51 of the valve spool 48. The retaining means 38 in this embodiment includes a valve spool centering spring device 52 disposed within the counterbore between the disk 42 and the valve body 47. The outlet port 18 communicates generated pilot pressure to the counterbore/pilot chamber.

Figure 3:
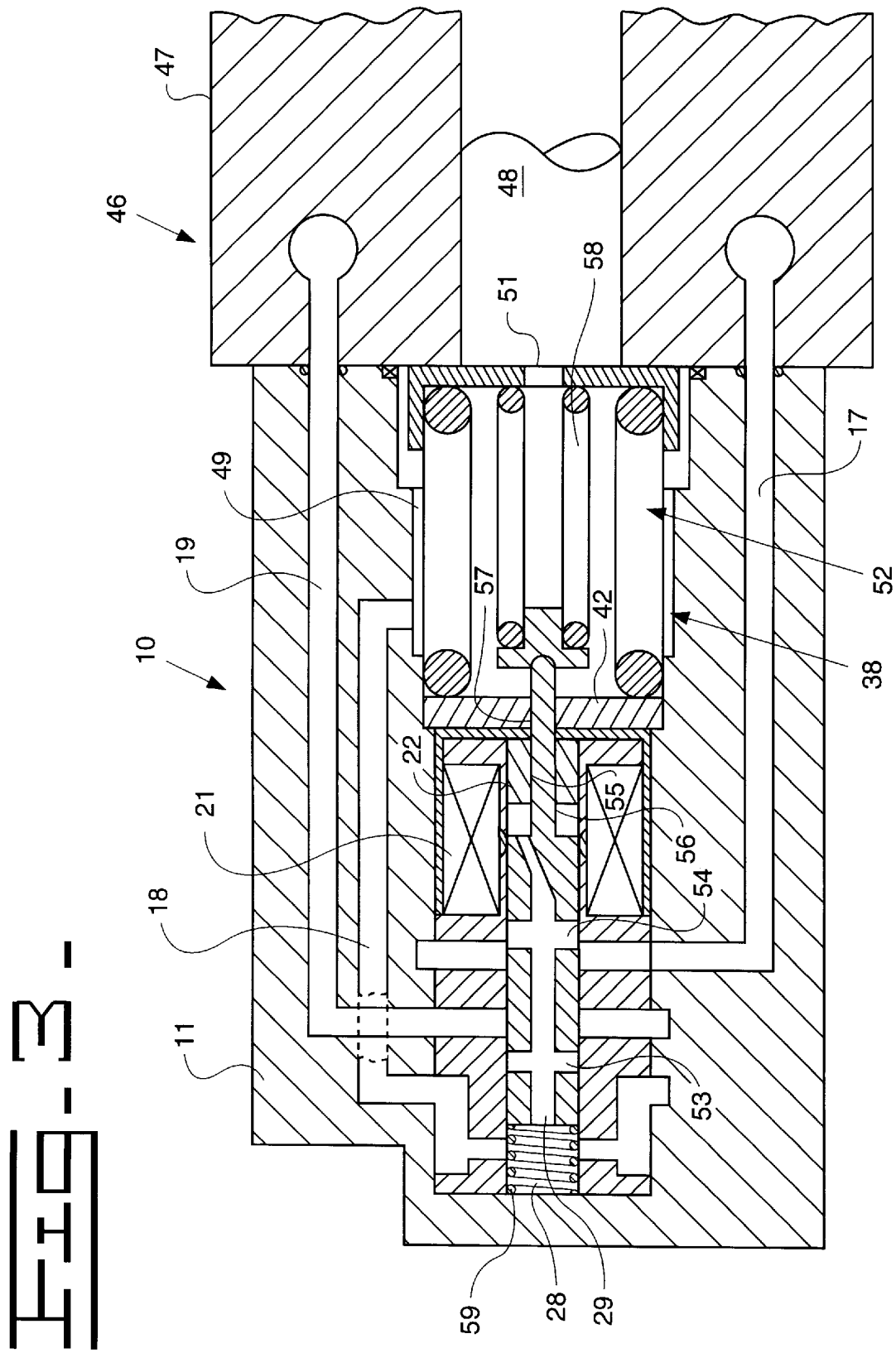
FIG. 3 is a diagrammatic sectional view of yet another embodiment of the present invention.

FIG. 3 discloses yet another embodiment of the integrated electrohydraulic actuator 11 and utilizes the same reference numerals to designate similarly constructed counterpart elements as identified in the embodiment of FIGS.1 and 2. In this embodiment, the metering means 26 includes the axial passage 29 in the armature 24 and two pair of radial passages 53,54 in the armature axially spaced along and opening into the axial passage. The outlet port 18 continuously communicates with the fluid chamber 28. A cylindrical stem 55 extends from the armature through a central opening 56 in the pole piece 22 and a central opening 57 in the disk 42. A feedback spring 58 is disposed between the valve spool 48 and the stem 55 so that a feedback force is exerted against the armature 24 when the valve spool moves toward the disk 42. The feedback spring 58 biases the armature to a position communicating the inlet port 17 with the radial passages 54. A spring 59 is disposed within the fluid chamber 28 to dampen movement of the armature. Alternatively, the stem 55 may be a separate stem positioned between the armature and the feedback spring 58.

INDUSTRIAL APPLICABILITY

The embodiment of FIG. 1 illustrates an integrated electrohydraulic actuator used primarily as a pressure control actuator suitable for use with, for example, a hydraulic clutch or brake. In use, the spring 32 normally biases the armature 24 to the position shown blocking the inlet port 17 from the outlet port 18 and communicating the outlet port 18 with the tank port 19 through the annular groove 31. Energizing the coil 21 with an electric current causes the armature 24 to be attracted to the pole piece 22 causing the armature to move rightward causing the land 36 to block the outlet port 18 from the tank port 19 and communicate the inlet port 17 with the outlet port through the annular groove 31. The pressure in the annular groove and the outlet port acts on the differential area 37 of the armature so that the generated output pressure is proportional to the input current to the coil.

The integrated electrohydraulic actuator 10 of FIG. 3 also functions as a pressure control actuator. The actuator in this embodiment however is designed to be secured to the hydraulic control valve 46 and to define the pilot chamber 49 at the end of the valve spool 48 with the outlet port 18 communicating with the pilot chamber through internal passages. Pilot pressure is generated in the outlet port 18, and thus the pilot chamber 49, by energizing the coil 21 as described above.

The integrated electrohydraulic actuator 10 of FIG. 3 functions as a position control actuator for controlling the position of the valve spool 48 instead of controlling the pressure in the outlet port 18. In this embodiment, a resilient feedback force is exerted on the armature 24 by the feedback spring 58 instead of having a pressure feedback through a differential area as described above. In use, the feedback spring 58 moves the armature to the position shown blocking the radial ports 53 from the tank port 19 and communicating the inlet port 17 with the pilot chamber 49 through the outlet port 18, the radial passages 54 and the axial passage 29. The combined force of the centering spring device 52 and the force generated by the fluid pressure in the pilot chamber holds the valve spool 48 at the position shown against a biasing force, not shown, acting on the other end of the valve spool. Energizing the coil 21 with an electric current causes the armature 24 to be attracted to the pole piece 22 with a force proportional to the strength of the current. This causes the armature to move rightward to initially communicate the outlet port 18 with the tank port 19 through the radial passages 53 and subsequently begins blocking the inlet port 17 from the outlet port 18. This reduces the fluid pressure in the pilot chamber 49 allowing the biasing force acting on the other end of the valve spool 48 to move the valve spool leftward. Leftward movement of the valve spool causes the feedback spring 58 to exert a feedback force on the armature through the stem 55 proportional to the current input to the coil 21 to counteract the force generated by the coil. The leftward movement of the valve spool will continue until the feedback force and the energizing force of the coil acting on the armature equalizes. At that point, communication between the inlet and outlet ports and between the outlet and tank ports is controllably metered such that displacement of the valve spool is proportional to the level of the energizing force exerted on the armature by the coil.

In view of the above, it is believed that the structure of the present invention provides an improved low cost, electromagnetic efficient electrohydraulic actuator. The low cost is achieved by integrating the electric coil within the sleeve and making the fluid metering function an integral part of the armature slidably disposed in the sleeve so that the armature takes the place of a valve spool and is the only movable part. The increased efficiency is achieved by deeply integrating the coil within the housing and slidably positioning the armature in the sleeve/coil so that no air gap exist. Deeply integrating the coil within the housing also helps dissipate heat from the coil.

Other aspects, objects and advantages of this invention can be obtained from a study of the drawings, the disclosure and the appended claims.

We claim:

1. An integrated electrohydraulic actuator comprising:

a housing having an bore and an end wall at one end of the bore;

a sleeve having an axial bore and seated in the bore of the housing and co-operating therewith to define an inlet port, an outlet port and a tank port opening into the axial bore;

an annular coil disposed in the bore of the housing at one end of the sleeve and having a pole piece fixedly secured within the annular coil;

a cylindrical armature slidably disposed in sealing contact with the axial bore and having fluid metering means integrated therein for controllably metering fluid flow between the inlet and outlet ports and between the outlet and tank ports so that the armature functions as a valve spool when the coil is energized; and means for retaining the sleeve and the coil in the housing so that the armature is the only movable component.

2. The integrated electrohydraulic actuator of claim 1 wherein the annular coil is integrated into the sleeve.

3. The integrated electrohydraulic actuator of claim 1 wherein a first fluid chamber is defined between the armature and the pole piece, a second fluid chamber is defined between the armature and the wall and the armature has an axial passage interconnecting the first and second chambers.

4. The integrated electrohydraulic actuator of claim 3 including a spring disposed in the first chamber biasing the armature away from the pole piece.

5. The integrated electrohydraulic actuator of claim 3 wherein the metering means includes an annular groove in the armature continuously communicating with the outlet port, the spring normally biases the armature to a position communicating the annular groove with the tank port and the armature is attracted to the pole piece to establish communication between the inlet port and the annular groove when the coil is energized by an electric current input thereto.

6. The integrated electrohydraulic actuator of claim 5 including means for defining a differential area on the armature with the differential area being continuously subjected to fluid in the outlet port so that the fluid pressure in the port is proportional to the current input to the coil.

7. The integrated electrohydraulic actuator of claim 6 wherein the axial bore of the sleeve has an enlarged bore portion defining an annular surface and the armature has an enlarged fluid metering land slidably disposed in the enlarged bore portion, the land and the annular surface in combination defining the differential area.

8. The integrated electrohydraulic actuator of claim 7 wherein the housing has a counterbore formed in the housing defining an annular shoulder adjacent the bore in the housing and the retaining means includes an annular groove formed in the counterbore housing, a disk positioned in the counterbore and a annular retainer seated in the annular groove in the counterbore to hold the disk against the shoulder.

9. The integrated electrohydraulic actuator of claim 8 wherein the outlet port communicates with the counterbore.

10. The integrated electrohydraulic actuator of claim 9 in combination with a hydraulic valve having a valve spool, and wherein a valve spool centering spring device is disposed in the counterbore to hold the disk against the shoulder.

11. The integrated electrohydraulic actuator of claim 3 wherein the outlet port continuously communicates with the second chamber and the metering means includes the axial passage in the armature and first and second radial passages in the armature and continuously communicating with the axial passage.

12. The integrated electrohydraulic actuator of claim 11 in combination with a hydraulic valve having a valve spool, and wherein the housing has a counterbore formed in the housing defining an annular shoulder adjacent the bore in the housing and the retaining means includes a disk positioned in the counterbore and a valve spool centering spring device disposed in the counterbore to hold the disk against the shoulder.

13. The integrated electrohydraulic actuator of claim 12 including a central opening extending through the pole piece, another central opening extending through the disk, a cylindrical stem extending from the armature through the central openings, and a feedback spring disposed between the valve spool and the stem so that a feedback force is exerted against the armature when the valve spool moves toward the disk.

14. The integrated electrohydraulic actuator of claim 13 wherein the feedback spring normally biases the armature to a position communicating the inlet port with the first radial passage and the armature is attracted to the pole piece to establish communication between the second radial passage and tank port when the coil is energized by an electric current input thereto so that displacement of the valve spool is proportional to the current.

15. The integrated electrohydraulic actuator of claim 14 wherein the stem is secured to and extends from the armature.

\* \* \* \* \*